T. SEXSMITH.
MILK-COOLERS.

No. 181,110. Patented Aug. 15, 1876.

WITNESSES:
C. Neveux
J. Goethals

INVENTOR:
T. Sexsmith
BY
Munn & Co.
ATTORNEYS.

UNITED STATES PATENT OFFICE.

THOMAS SEXSMITH, OF ONEONTA, NEW YORK.

IMPROVEMENT IN MILK-COOLERS.

Specification forming part of Letters Patent No. 181,110, dated August 15, 1876; application filed June 6, 1876.

*To all whom it may concern:*

Be it known that I, THOMAS SEXSMITH, of Oneonta, in the county of Otsego and State of New York, have invented a new and Improved Milk-Cooler, of which the following is a specification:

My invention consists of an elevated cooling (or warming) compartment in the bottom of the pan which holds the milk, into which the cooling (or heating) medium is delivered by an inlet-pipe so arranged that the said medium is discharged directly upward from the mouth of the pipe against the shell of the compartment, and thus acts more directly on the milk than it otherwise would, and the discharge-passage leads out from the bottom of said compartment, to which the warmer (or colder, as the case may be) part is forced by the incoming part being discharged between it and the shell of the compartment, which also facilitates the operation.

The invention also consists of a contrivance for mounting the pans on their supporting-stools, so that they can be readily leveled up in case the stools are not level.

Figure 1:
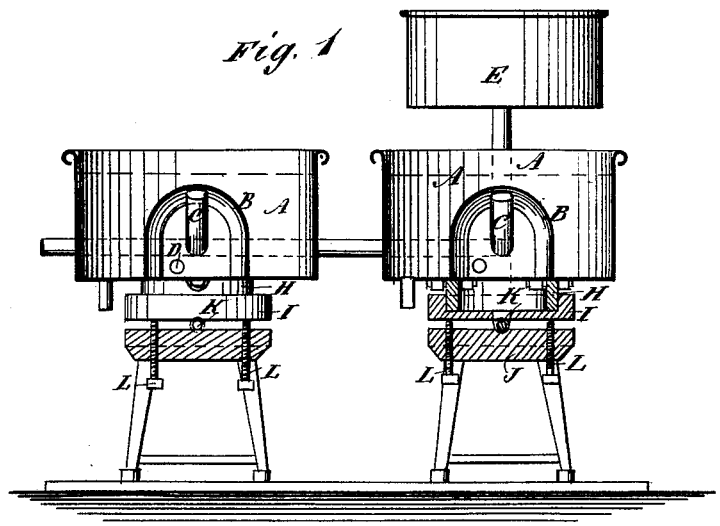
Figure 2:
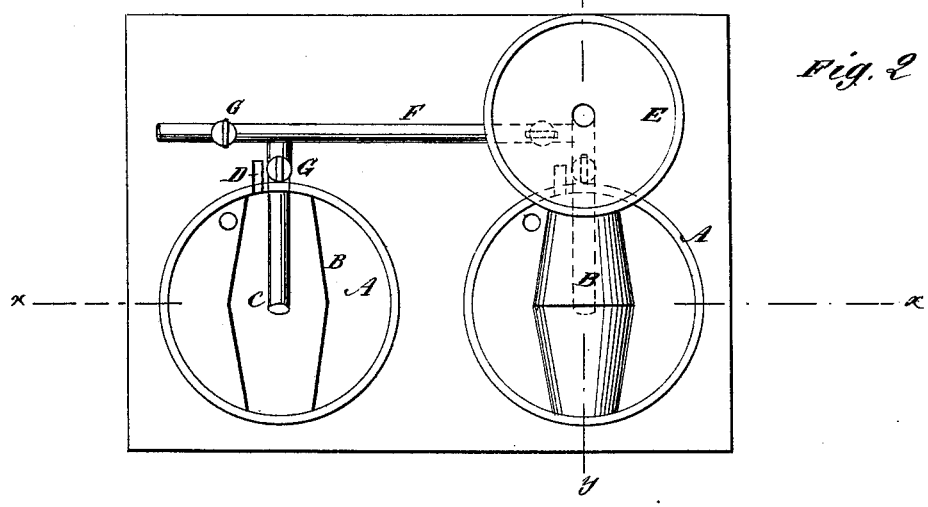
Figure 3:
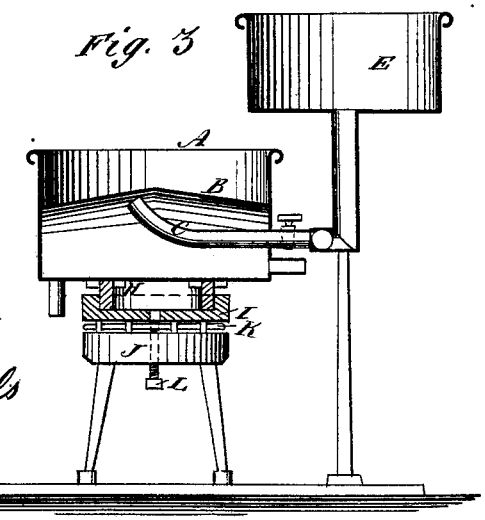

Figure 1 is a sectional elevation of a couple of pans contrived according to my improvements, the section being taken on the line $x$ $x$ of Fig. 2. Fig. 2 is a plan view with one of the cooling-compartments sectioned horizontally. Fig. 3 is a transverse section taken on line $y$ $y$, Fig. 2.

Similar letters of reference indicate corresponding parts.

A represents the pans, in each of which is a cooler or warmer, B, extending across the pans from side to side, and nearly as high as the pan, into which the inlet-pipe C is arranged to discharge against the top, so that the water for cooling, or steam or water for warming, for which the apparatus is alike applicable, will have the best effects, and the discharge-pipe D is located near the bottom, toward which the water flows as it warms, making room for the inflowing colder water next to the wall of the cooler.

E is the tank, from which the water flows into the pans through main pipe F and the inlet-pipes C, the said pipes being provided with cocks G, to shut off from, and let on to, any one of a series of pans independently of the others. The inlet-pipes will, in practice, be so connected that they can be readily detached to allow of removing the pans when required. The pans have a collar, H, attached to the bottom, which sets in a kind of cup, I, that is pivoted to the stool or bench J at K, and also supported on adjusting-screws L, for leveling the pans readily.

Having thus described my invention, I claim as new and desire to secure by Letters Patent—

1. In a milk-cooler, the combination, with the U-shaped cooler B and pan A, containing the same, of the pipe C, arranged with its discharge end projecting upward beneath the top portion of said cooler, as and for the purpose specified.

2. The milk-pan having a collar, H, attached to the bottom, in combination with a supporting-cup, I, fixed on a post, K, and provided with set-screws L, substantially as specified.

THOMAS SEXSMITH.

Witnesses:
C. L. WILBUR,
HARTFORD D. NELSON.